Figure 1:
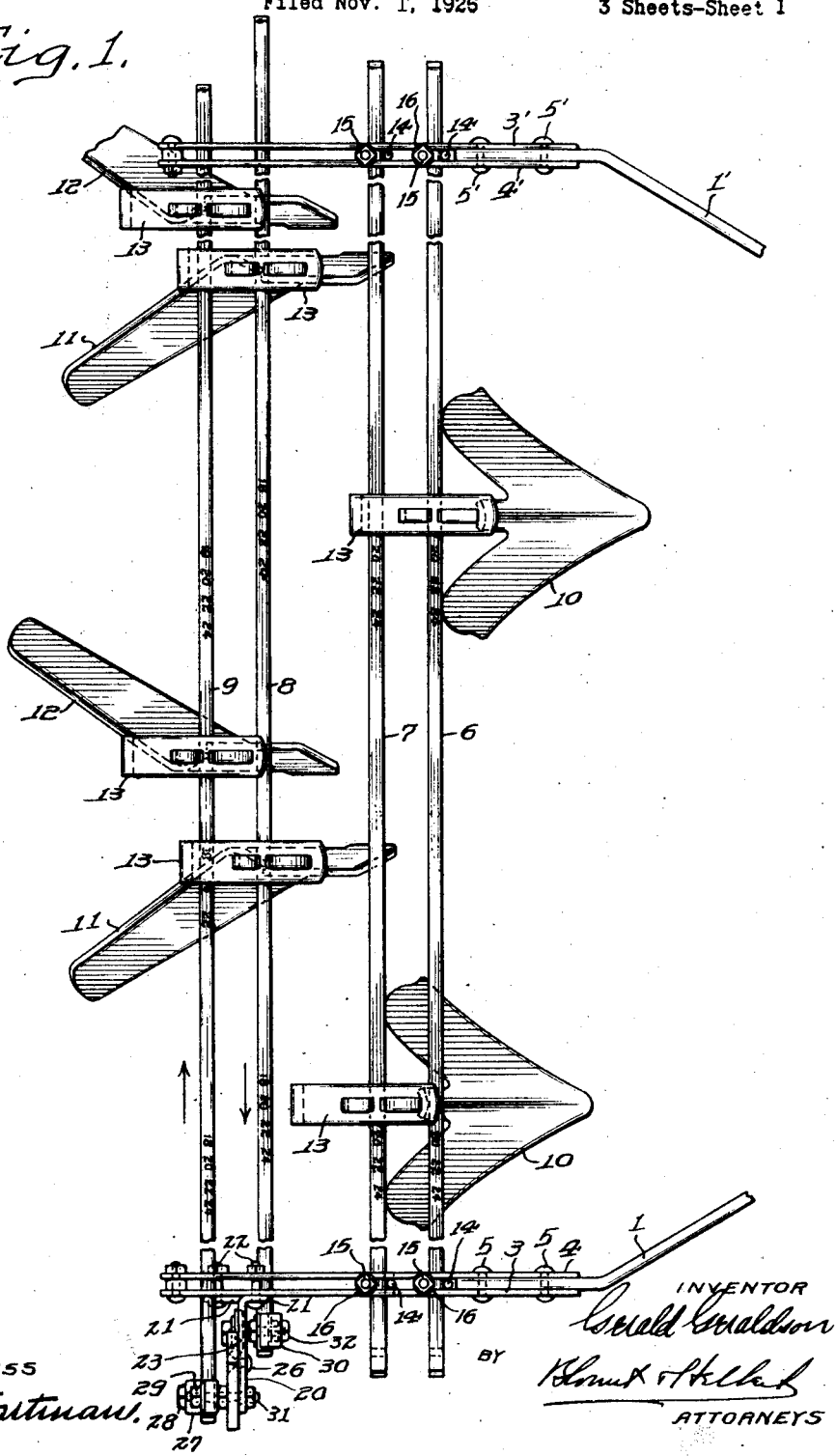

May 1, 1928.  
G. GERALDSON  
CULTIVATOR  
Filed Nov. 1, 1926

1,668,067

3 Sheets-Sheet 1

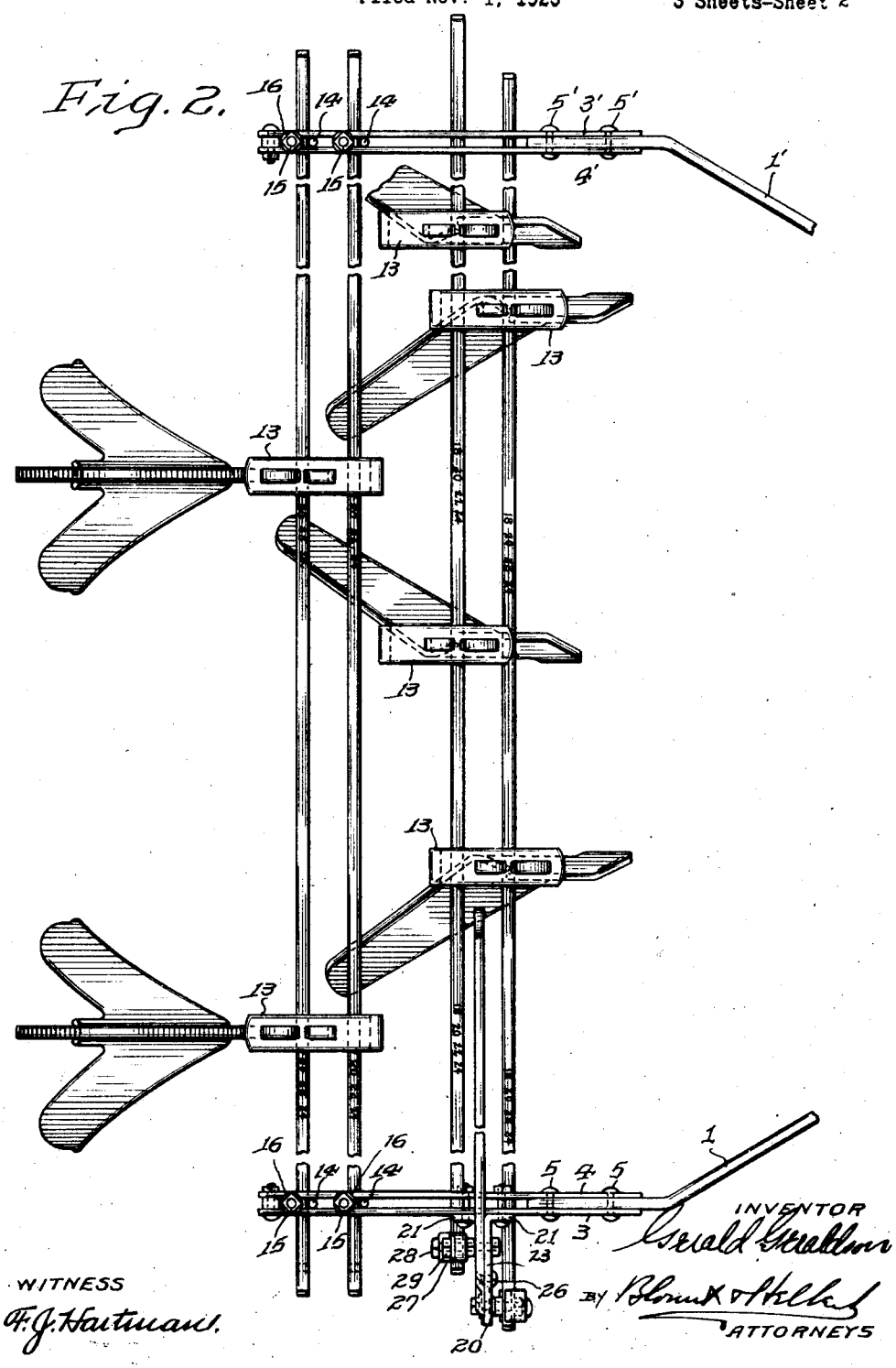

May 1, 1928.  1,668,067
G. GERALDSON
CULTIVATOR
Filed Nov. 1, 1926  3 Sheets-Sheet 3
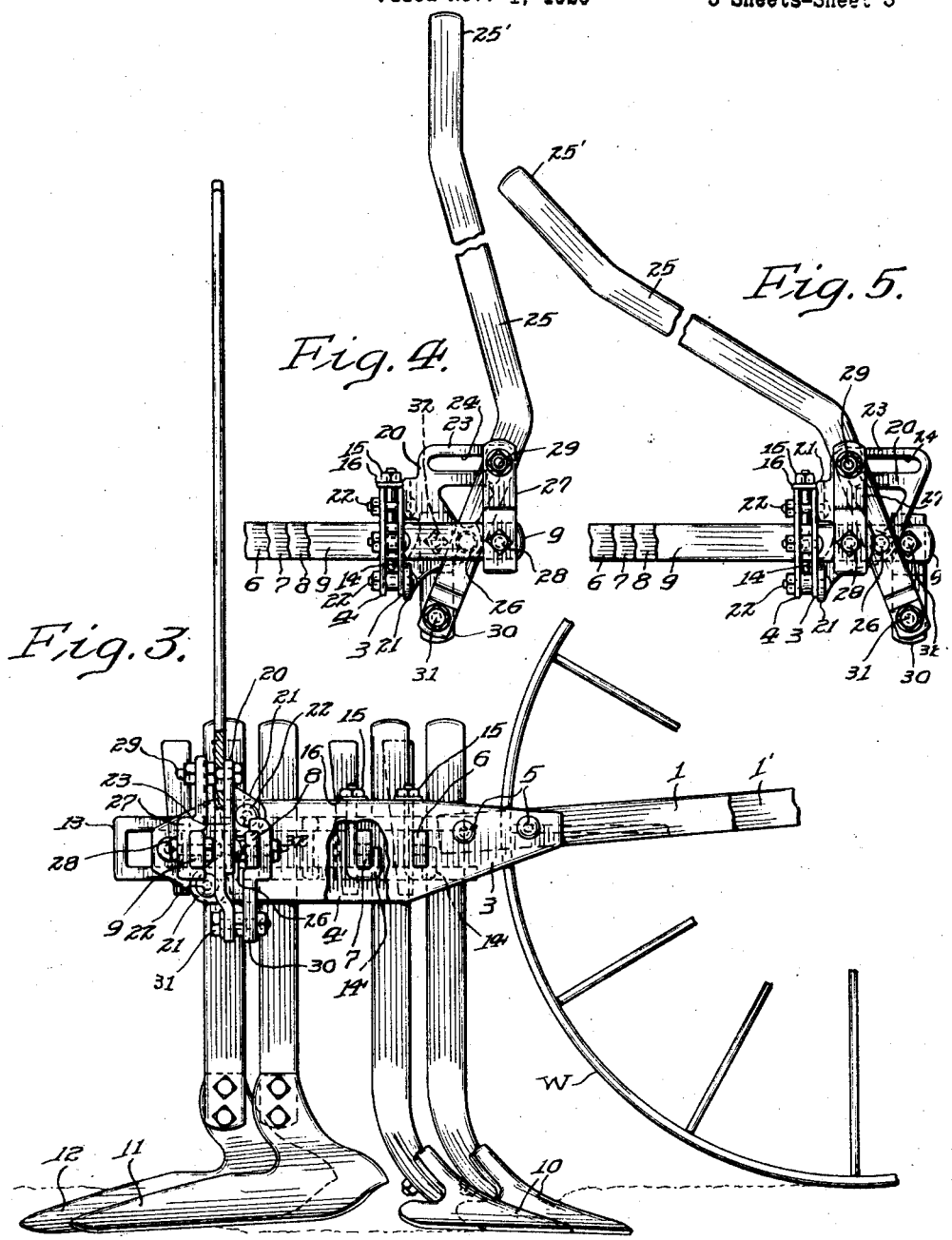

Patented May 1, 1928.

1,668,067

UNITED STATES PATENT OFFICE.

GERALD GERALDSON, OF PHILADELPHIA, PENNSYLVANIA, ASSIGNOR TO S. L. ALLEN & CO., INC., A CORPORATION OF PENNSYLVANIA.

CULTIVATOR.

Application filed November 1, 1926. Serial No. 145,421.

My invention relates to that class of cultivators, usually horse drawn, which are intended to simultaneously cultivate a plurality of parallel rows of plants such as beets or beans. Heretofore such implements have usually been provided with a fixed horizontally extending tool bar to which are affixed plow-like tools generally referred to as "sweeps" which are intended to work the soil about midway between the rows of plants and are therefore secured to the bar at laterally spaced intervals substantially corresponding to the distance between the rows, and with a separate pair of relatively laterally adjustable tool bars to which are secured the hoes which are intended to work the soil in proximity to each row of plants and on opposite sides thereof. These hoes are ordinarily made in rights and lefts so as to work in pairs and are secured to the said adjustable bars, which are disposed one in advance of the other and either in front of or behind the fixed tool bar, in such manner that all of the hoes intended to work, for example, on the right hand side of the plant rows, are on one bar and all of the hoes intended to work on the left hand side of the rows are on the other bar, and means, manually controllable by the operator, are provided for moving these hoe-supporting bars simultaneously in opposite directions with respect to each other for a limited distance, thereby enabling the hoes respectively comprising the different pairs to be simultaneously moved toward or away from each other to increase or decrease the distance between the hoes of each pair. Thus when it is desired to utilize the implement for cultivating a predetermined number of rows of plants extending in parallel relation to each other at a given distance apart, for example, four rows respectively spaced 24" apart, the operator usually clamps five sweeps on the fixed tool bar at 24" intervals so that the three middle sweeps will work the soil approximately at the centers of the spaces between the four rows of plants and the two outer sweeps will respectively work the soil approximately 12" beyond each of the outer rows. For working the soil in proximity to one side of each plant row he then clamps on one of the movable tool bars four similar hoes, for example right hand, hoes at 24" intervals and a like number of left hand hoes at similar intervals upon the other movable tool bar, so that four pairs of hoes are thus provided, one hoe of each pair being slightly in advance of the other and each pair being adapted to be moved along a row on opposite sides thereof and in close proximity to the plants so as to thoroughly work the soil adjacent their roots.

To enable the plows to be conveniently set the proper distance apart on the tool bars for rows of any given spacing, the bars are ordinarily indexed by the manufacturer while the relative spacing between the hoes of each pair to accommodate the machine to plants of different sizes or for any other desired reason may be readily varied by suitable manipulation of the movable tool bar adjusting means.

It will thus be apparent that in a machine of the general construction above referred to and embodying a stationary tool bar for supporting the sweeps and a pair of relative movable bars for supporting the hoes, the sweeps must always be positioned either in advance of the hoes or in rear thereof depending upon the relative arrangement of the stationary and adjustable bars adopted by the manufacturer, and as it has been customary to place the stationary bar in advance of the movable bars the sweeps are consequently usually disposed in advance of the hoes. Under certain conditions encountered in practice, however, and which are usually governed by the age of the plants being cultivated or condition and quality of the soil, it is desirable to reverse this arrangement and dispose the sweeps behind the hoes, thereby enabling the machine to effect better cultivation than can be attained when the hoes are in rear of the sweeps, and it is therefore an object of the present invention to provide a cultivator of the general character to which reference has hitherto been made but which is so constructed as to permit the hoes to be positioned in advance of the sweeps or vice versa as may be desired and the requisite manual adjustment of the relative spacing of the hoes of each pair effected when in either position.

Other objects, advantages and novel features of design, construction and arrangement comprehended by the invention are referred to hereinafter with greater particularity as will be apparent from the accompanying drawings showing portions of a cultivator constructed in accordance with one form of the invention as hereinafter described.

Generally speaking, my invention consists in providing a cultivator with two pairs of tool bars each capable of supporting either the hoes or the sweeps, in combination with means interchangeable with either pair of bars for holding either of them stationary and for manually shifting the bars of the other pair so as to vary the relative spacing of the tools supported from them. With a machine of this character either pair of bars may be utilized as the stationary bars for supporting the sweeps and the other pair of bars as the adjustable bars for supporting the hoes, and as the pairs of bars are respectively arranged one behind the other it is thereby possible to dispose the sweeps in the rear of the hose or vice versa to adapt the machine to the particular conditions under which it is to operate.

As the construction and arrangement of cultivators of the general character of that forming the subject of my invention are well known and with a view to avoiding prolixity of description, I have illustrated in the accompanying drawings only so much of a cultivator constructed in accordance with my invention as is requisite for an adequate understanding thereof, Fig. 1 in the said drawing being a fragmentary top plan view showing the arrangement of the tool bars, tool bar shifting means and adjacent portions of the cultivator frame when the forward pair of bars is utilized as the stationary bars for supporting the sweeps and the rearmost pair as the adjustable bars for supporting the hoes. Fig. 2 is a similar view but showing the arrangement of the same parts when the sweeps are supported on the rear pair of bars and the hoes on the forward pair, the pairs of hoes in this figure being shown as separated to their maximum extent while in Fig. 1 they are shown as closely adjacent each other. Fig. 3 is a fragmentary end view of the parts shown in Fig. 1 and also showing a fragmentary portion of one of the cultivator wheels; Fig. 4 is a fragmentary detail view showing the bar sifting mechanism when the bars are at the limit of their movement in the direction which causes the hoes to approach most closely together and assume the position shown in Fig. 1, and Fig. 5 is a similar view showing the position of the mechanism when the bars are at the limit of their movement in the opposite direction and the hoes most widely separated as in Fig. 2. The same numerals are used to designate the same parts in the several figures.

It will be understood that the cultivator comprises the usual frame which may be of any preferred construction and is supported on wheels, one of which is indicated at W.

As cultivators of this type are generally drawn by horses a pole is ordinarily extended forwardly from the frame to which the horses may be hitched while the frame may support a seat for the driver and other parts customarily found in implements of this general character and which are not shown in the drawings as they form no part of the present invention.

In accordance with my invention supporting bars 1, 1' are rearwardly extended from a suitable point at each side of the frame, the rearmost extremity of the bar 1 being received between a pair of vertically disposed plates 3 and 4 which are secured thereto by rivets 5, and the corresponding end of the bar 1' being received between similar plates, 3', 4', secured thereto by rivets 5'. These several plates are suitably perforated for the passage of ends of the horizontally disposed transversely extending tool bars 6, 7 and 8, 9 respectively arranged in pairs and in the same horizontal plane, the holes in the plates being sufficiently large to allow the bars to slide in them when required. To these bars may be clamped the sweeps 10, 10 and the hose 11 and 12 by suitable clamps 13 which may be of any preferred construction operative to hold the shanks of the tools in fixed relation to the bars.

In the particular arrangement of the tools shown in Fig. 1 the sweeps are attached to the forward tool bars 6 and 7, some of the sweeps being secured to one bar and some to the other although, of course, all could be secured to either of the bars, and as it is desirable that the sweep holding bar or bars be held rigid with respect to the frame of the machine I provide U-shaped clamps 14 of suitable size to hook beneath the bars and pass up between the plates 3, 5 and 3', 5', these clamps being threaded on one end and provided with nuts 15 in such manner that when the nut is screwed down on a washer 16 bridging the upper surface of the plates the U-shaped end of the clamp will be drawn up against the bar and the latter in turn drawn snugly against the walls of the openings in the plates so as to bind the bar rigidly thereto and prevent it from moving transversely of the machine. These U-shaped clamps may be readily removed when desired and employed with equal facility on the bars 8 and 9 so as to hold them from transverse movement when they are employed for supporting the sweeps as shown in Fig. 2 so that by use of the clamps either pair of bars may be rigidly secured to the plates when desired.

For effecting the desired lateral shifting of the hoe supporting bars (which may be either the bars 6 and 7 or 8 and 9 in accordance with the particular arrangement of the parts) I provide means now to be described and which may be used with equal facility with either pair of bars, said means being operative when suitably actuated to cause the bars of the pair with which they are operatively associated to move simultaneously relatively to each other in opposite directions so as to cause the members of each pair of hoes which are attached to the bars to approach or recede from each other. As shown, said means comprise a bracket 20 having a flange 21 removably bolted to the plates 3 and 4 by bolts 22 extending through suitably positioned holes in the plates and another flange 23 extending outwardly from the plates at right angles to the flange 21 and having a slot 24 formed in its upper part; to the lower part of the plate an operating lever 25 is pivoted by a pivot bolt 26, a short length of the lever being arranged to depend below the bolt and the major portion of the lever extending upwardly so as to overlie the slot 24 and terminate in a handle 25' a considerable distance thereabove and at a point which may be conveniently reached by the operator. This lever is shown as attached to the adjacent end of the bar 9 in Fig. 1 by means of a clip 27 whose lower end is hooked about the bar and removably secured thereto by a bolt 28 extending through the clip and a hole in the bar and whose upper end is pivotally secured to the lever by a bolt 29 extended through the lever and the slot 24 which latter forms a guide for the bolt. In a similar way the lower end of the lever below the pivot bolt 26 is attached to the adjacent end of the bar 8 by a clip 30 whose lower end is pivoted to the lower end of the lever by a pivot bolt 31 and whose upper end is bent over the end of the bar and removably attached thereto by a bolt 32, all as best shown in Fig. 4. It will therefore be apparent that when the handle 25' is moved to the left from the position shown in said figure the lever will turn about the pivot bolt 26, thus carrying the clip 27 to the left and the clip 30 to the right, and as the bolts 29 and 31 are disposed at equal distances from the bolt 26 the extent of movement imparted to the clips and in turn to the tool bars to which they are respectively attached will be equal in the amount but in opposite directions; as by this movement of the lever the bars are respectively moved in the direction of the arrows in Fig. 1 the members 11 and 12 of the several pairs of hoes mounted on the bars will be caused to separate until further movement of the bars is prevented by the bolt 29 reaching the other end of the slot 24.

It will be noted that the several tool bars are respectively provided with index figures on their upper faces to enable the convenient initial setting of the sweeps to correspond with the distances between the rows of plants which are to be cultivated; thus, if all of the sweeps are set to the numerals "18" on the bars they will be properly positioned for the cultivation of rows 18" apart. The hoes may then be clamped on the other set of bars about midway between the sweeps, and thereafter by suitable adjustment of the lever 25 the members of each pair of hoes may be adjusted toward or away from each other to properly accommodate the size of the plants in the rows, larger plants obviously requiring a greater distance between the hoes than smaller ones. It will of course be observed that all of the right hand hoes 11 are clamped on one of the bars, for example, the bar 8 and all of the left hand hoes 12 upon the other bar 9 of that pair, while the sweeps 10 which are intended to work the ground at points midway of the rows are secured to either or both of the other pair of bars at properly spaced intervals, said bars being held stationary with respect to their supporting plates through the medium of the U-clamps 14 as hitherto described.

To enable the bar shifting mechanism to be employed selectively with either pair of tool bars, the plates 3 and 4 are provided adjacent both pairs of bars with suitably positioned holes for the passage of the bolts 22 by which the bracket 20 may be secured in position and the ends of the bars 6 and 8 perforated for the passage of the bolts 28 and the ends of bars 7 and 9 similarly perforated for the passage of bolts 32 so that the clips 27 and 30 may respectively be secured thereto. Thus it is only necessary in order to shift the bar actuating mechanism from the bars 8 and 9 to the bars 6 and 7 to remove the bracket bolts 22 and clip bolts 28 and 32; the bracket can then be placed adjacent the bars 6 and 7 and secured in place by means of bolts 22 and the clips then respectively attached to the bars 6 and 7 by bolts 28 and 32 as shown in Fig. 5, thus enabling these bars to be shifted laterally by the lever 25 in a manner similar to the bars 8 and 9 as already described, the latter under these circumstances being of course secured in fixed relation to the plates by means of the U-clips 14.

It will thus be apparent that I have provided a cultivating implement embodying two pairs of tool supporting bars together with mechanism which may be selectively utilized in connection with either pair of bars to shift them laterally in opposite directions so as to adapt them for the support and adjustment of hoes or other cultivating tools intended to operate in pairs upon opposite sides of rows of plants disposed at predetermined intervals together with means for holding the other pair of bars stationary to thereby adapt either or both of said bars for supporting tools intended to work at fixed intervals between the rows, and that as one pair of bars is disposed in advance of the other the machine may therefore be readily arranged with the fixed tools in advance of the adjustable ones or vice versa so as to conform the machine to the particular conditions under which it is to be operated and thereby bring about maximum efficiency in the performance of its intended function.

While I have herein described one form of my invention I do not thereby desire or intend to specifically limit myself to the precise details of design, construction and arrangement of the various parts to which I have referred as minor changes may be made therein if desired without departing from the spirit and scope of the invention as defined in the appended claims.

Having thus described my invention, I claim and desire to protect by Letters Patent of the United States:

1. In a cultivator designed for the simultaneous cultivation of a plurality of rows of plants, a plurality of tool bars arranged in pairs one behind the other, means for supporting the bars, means selectively connected with either pair of bars and operative when so connected to hold such bars in fixed relation with said supporting means, and means selectively connectable with either pair of bars and operable when so connected to simultaneously shift said bars transversely in opposite directions.

2. In a cultivator designed for the simultaneous cultivation of a plurality of rows of plants, four tool bars arranged in pairs transversely of the machine and in the same horizontal plane, means for supporting said bars so as to permit longitudinal movement thereof with respect to said supporting means, means cooperative with said supporting means for selectively locking either pair of bars thereto so as to maintain a fixed relation between said bars and said supporting means also, and means adapted for operative attachment to said supporting means and either pair of bars operable when so attached to simultaneously shift such bars in opposite directions with respect to said supporting means.

3. In a cultivator designed for the simultaneous cultivation of a plurality of rows of plants, four tool bars arranged in pairs in the same horizontal plane at spaced intervals one behind the other, means for supporting the bars comprising a plate having separated apertures respectively adapted to slidably receive the ends of the bars, and means adapted for operative attachment to said plate and either pair of bars and operable when so attached to simultaneously shift the members of either pair of bars in opposite directions, said means comprising a bracket attachable to said plate, a lever pivoted to the bracket and means for respectively connecting the ends of the bars to the lever at points above and below the pivotal point thereof.

4. In a cultivator designed for the simultaneous cultivation of a plurality of rows of plants, four tool bars arranged in parallel relation one before the other and in the same horizontal plane, supporting means for the bars comprising a plate having slots adapted to slidably receive the ends of the bars, means for supporting the plate from the cultivator frame, means interchangeable with either pair of bars for selectively locking either the foremost pair of bars or the rearmost pair of bars to said plate to thereby render said bars suitable for supporting tools intended to work in a fixed position between the rows to be cultivated, and means also interchangeable with either pair of bars and thus adapted for operative attachment to the pair of bars not so locked and to the adjacent supporting plate and operable when so attached to shift said bars transversely in opposite directions to thereby adapt said bars for supporting tools intended to work in pairs on opposite sides of and closely adjacent each row.

5. In a cultivator designed for the simultaneous cultivation of a plurality of rows of plants and having four tool bars arranged in pairs and disposed one in front of the other, a plurality of ground working tools supported at intervals on one pair of said bars and adapted to work the soil midway between the rows, a plurality of ground working tools supported at intervals by one of the other pair of bars, said tools being respectively adapted to work the soil closely adjacent one side of each of the rows, a plurality of tools supported from the other bar of said pair and respectively intended to work in like manner on the opposite side of each row whereby the tools of the last mentioned bars form cooperative pairs each adapted to embrace a row of plants, means for supporting the bars adjacent their ends, means selectively attachable to either pair of bars for locking to said supporting means that pair of bars carrying the tools intended to work between the rows to thereby render said bars stationary with respect to the supporting means, and means also selectively detachable to either pair of bars and manually operable when so attached to shift longitudinally in opposite directions that pair of bars supporting the members of the different pairs of tools intended to work adjacent the sides of the rows.

6. In a cultivator designed for the simultaneous cultivation of a plurality of rows of plants, a plurality of tool bars arranged in pairs one behind the other, means for supporting the bars so as to allow said bars to slide longitudinally, means adapted for operative attachment to either pair of bars and manually operable when so attached to shift said bars simultaneously in opposite directions, and means cooperative with said supporting means for restraining the pair of bars not attached to said shifting means against longitudinal movement.

7. In a cultivator designed for the simultaneous cultivation of a plurality of rows of plants, a plurality of tool bars arranged in pairs one behind the other, means for supporting the bars in longitudinally movable relation, means adapted for operative connection with said supporting means and with either pair of bars and manually operable when so connected to simultaneously shift such pair of bars longitudinally in opposite directions, and means adapted for connection with said supporting means and with either pair of bars operative to hold that pair of bars which are unconnected with said manually operable means in fixed relation with said supporting means.

8. In a cultivator designed for the simultaneous cultivation of a plurality of rows of plants, a plurality of tool carrying bars arranged in spaced pairs at spaced intervals one behind the other in a horizontal plane, means for supporting the bars so as to normally allow them to be shifted laterally independently of each other, ground working sweeps, means operative to secure said sweeps to any of said bars, ground working plows designed to work in pairs on opposite sides of the rows, means operative to secure the plows to any of said bars, means attachable to any of said bars to hold them against lateral shifting whereby by use of said means the bars carrying the sweeps may be held rigid relatively to their supporting means, and means attachable to either pair of bars and operable when so attached to shift the bars of such pair laterally and simultaneously in opposite directions whereby when said means are attached to that pair of bars carrying the plows said pair of bars may be relatively adjusted so as to vary the distance between the respective pairs of plows.

In witness whereof, I have hereunto set my hand this 26 day of October, 1926.

GERALD GERALDSON.